March 22, 1927.
M. SALOUN
1,621,854
BOLT LOCKING MEANS
Filed Sept. 23, 1922
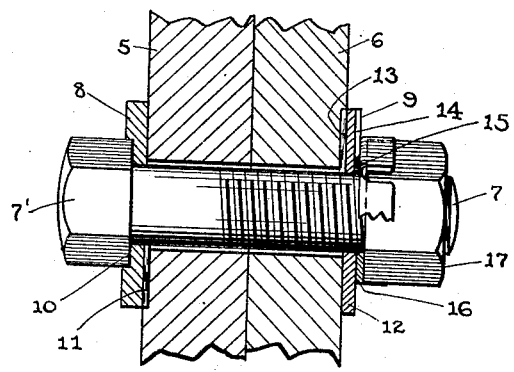
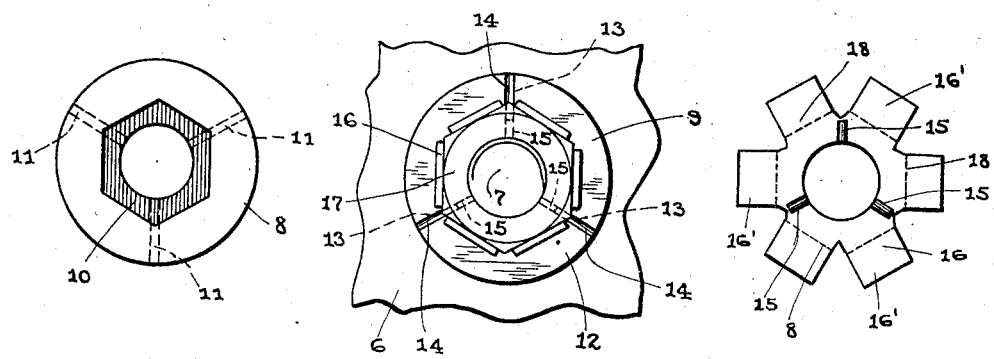
INVENTOR.
Martin Saloun
BY Morsell and Keeney
ATTORNEYS.

Patented Mar. 22, 1927.

1,621,854

UNITED STATES PATENT OFFICE.

MARTIN SALOUN, OF MILWAUKEE, WISCONSIN.

BOLT-LOCKING MEANS.

Application filed September 23, 1922. Serial No. 590,074.

This invention relates to improvements in bolt locking means.

It is one of the objects of the present invention to provide a bolt locking means which is adapted to lock both the bolt and the nut against accidental turning.

A further object of the invention is to provide a bolt locking means in which one portion will positively anchor into the support upon which it is placed and another part will positively engage the nut and lock it against turning.

With the above and other objects in view, the invention relates to the improved bolt locking means and its parts and combinations as set forth in the claims, and all equivalents thereof.

In the accompanying drawing, in which the same reference characters indicate the same parts in all of the views:

Fig. 1 is a side view of a bolt and nut provided with the improved bolt locking means shown extending through two pieces of material and provided with the improved locking means, parts being in section;

Fig. 2 is an end view thereof;

Fig. 3 is a face view of the bolt holding means; and

Fig. 4 is a face view of the nut holding member.

Referring to the drawing, the numerals 5 and 6 indicate two pieces of material which are shown as secured together by a bolt 7 provided with the improved locking means 8 and 9. The bolt 7 extends through the pieces of material and at its headed end 7' is engaged by the locking means 8 in the form of a washer having a recess 10 shaped to fit and receive the head 7' of the bolt 7 and prevent the independent turning thereof. The opposite side of the washer is formed with radial teeth or ribs 11 which bite into the material engaged and lock the bolt head against turning. A washer 12 positioned adjacent the opposite end of the bolt is formed with radial teeth or ribs 13 similar to the teeth 11 which also dig into the material engaged, while the outer face of the washer is formed with coincident radial recesses or grooves 14 to receive the radial ribs or teeth 15 of a washer 16 which is interposed between the washer 12 and the nut 17 threaded on the bolt 7. When the parts are firmly clamped together by turning the nut on the bolt, the outer end portions of the ears 16' are bent upwardly along the dotted lines 18 to bear against the side faces of the nut and lock the nut against turning. If it is desired to remove the bolt, it is only necessary to bend down the ears to their original position and then unscrew the nut in the ordinary manner. As the washer 16 is formed of soft metal, the ears may be bent to locking and unlocking position a number of times without liability of breaking.

From the foregoing description, it will be seen that the bolt locking means is of very simple construction, and is well adapted for the purpose described.

What I claim as my invention is:

1. The combination with a bolt having a nut threaded thereon, of a locking means therefor, comprising a washer member mounted on the bolt adjacent the nut and having equi-spaced radial biting ribs on its inner side and radial grooves in its outer side which extend from the washer opening to the periphery of the washer, and an independent locking washer mounted on the bolt between the washer member and the nut and having correspondingly spaced radial ribs on its inner side which enter the radial grooves of the washer member, the nut being freely turnable with relation to the washer and the locking washer also having bendable ears which bear against all of the side portions of the nut when said nut is in adjusted position to prevent turning of the nut.

2. The combination with a bolt having a nut threaded thereon, of a locking means therefor, comprising a washer member mounted on the bolt adjacent the nut and having more than two equi-spaced radial biting ribs on its inner side and more than two radial grooves in its outer side, and an independent locking washer mounted on the bolt between the washer member and the nut and having a correspondingly equi-spaced radial ribs on its inner side which enter the radial grooves of the washer member, the nut being freely turnable with relation to the washer and the locking washer also having bendable ears which bear against all of the side portions of the nut when said nut is in adjusted position to prevent turning of the nut.

In testimony whereof, I affix my signature.

MARTIN SALOUN.